3,031,428
SPINNING DOPE SOLUTIONS OF A VINYLIDENE CYANIDE INTERPOLYMER AND METHOD OF MAKING
James J. Shipman, Akron, and Gerald L. Smith, Lakewood, Ohio, assignors to The B. F. Goodrich Company, New York, N.Y., a corporation of New York
No Drawing. Filed Nov. 19, 1956, Ser. No. 622,776
12 Claims. (Cl. 260—32.6)

This invention relates to the preparation of stable, colorless solutions of synthetic polymers and even more particularly relates to solutions of vinylidene cyanide fiber-forming interpolymers that have been color stabilized by the treatment of either the undissolved interpolymer or an interpolymer solution with hydrogen peroxide.

Vinylidene cyanide fiber-forming interpolymers are described in U.S. Patents Nos. 2,615,865 through 2,615,880, 2,628,954, 2,650,911, 2,654,724, 2,654,728, 2,657,797, 2,716,104 through 2,716,106, and in copending applications Serial Nos. 402,823 filed January 7, 1954, 407,595 filed February 1, 1954, and 526,335 filed August 3, 1955. As described therein, synthetic fibers spun from such interpolymers possess unusually high strength and other desirable properties.

The various vinylidene cyanide interpolymers are found to be insoluble in many of the standard organic solvents used to dissolve other synthetic fiber-forming polymers including such well-known solvents as benzene, toluene, ortho, meta, and para-xylene, ethyl benzene, methanol, ethanol, methyl ethyl ketone, nitrophenol, and dioxane. A few specific solvents for the vinylidene cyanide polymers and interpolymers have been found including tetramethyl urea, alkyl phosphates, acetonitrile, nitromethane, dimethylformamide, dimethylsulfoxide, gamma-butyrolactone and isovalerolactone.

The vinylidene cyanide:vinyl acetate 1 to 1 molar ratio copolymer is one of the most preferred vinylidene cyanide interpolymers for preparing fibers and fabrics, and some of the more effective solvents for this particular copolymer are dimethylformamide, nitromethane, acetonitrile, gamma-butyrolactone and isovalerolactone. Excellent spinning dopes of the copolymer can be made in these solvents, and when these dopes are extruded through spinnerets into air or a bath which is a non-solvent for the polymer, fibers of good strength and good chemical resistance are obtained. It has been observed, however, that even though the spinning dopes are clear, they usually exhibit a slight amber color cast and, in the case of dimethylformamide, usually a red-brown color after standing a few hours. The clearest solution presently known is that in isovalerolactone, but even it is not completely colorless. This color tends to carry over undesirably into the spun filaments and fibers and may lead to restriction of use of the fibers in many potential applications where color control is an important requirement. It is often necessary to bleach these fibers before attempting to apply a dye in order to insure uniform color in the dyed material. It is also often desirable to obtain clear, colorless fibers for end uses in white goods. Hence the color cast in known solvent solutions of vinylidene cyanide:vinyl acetate copolymer is very undesirable and many attempts have been made to remove or prevent it.

It is an object of this invention to provide colorless spinning-dopes of vinylidene cyanide interpolymers. Another object is to provide spinning dopes of vinylidene cyanide:vinyl acetate copolymers in dimethylformamide, nitromethane, isovalerolactone or other copolymer solvents that do not develop a color cast before spinning is accomplished. A further object is to provide an oxidizing agent to add to vinylidene cyanide:vinyl acetate copolymer dissolved in dimethylformamide to prevent formation of a red-brown color which is characteristic of this solvent when used to dissolve polymers containing nitrile side groups. Yet another object is to produce white, lustrous synthetic fibers.

Oxidizing acids such as sulfuric and nitric, or reducing acids such as oxalic acid significantly retard color formation in solutions of vinylidene cyanide:vinyl acetate copolymer in dimethylformamide. Five percent sulfuric acid based on weight of polymer is one of the most effective acid stabilizers, but in general these solutions are extremely corrosive and are undesirable to use.

Inorganic oxidizing agents such as potassium permanganate, potassium dichromate, and sodium nitrite undergo reduction in solutions of vinylidene cyanide:vinyl acetate copolymer in dimethylformamide under acid conditions, namely, pH of 2 to 4, producing colors ranging from yellow and green to deep purple—depending upon the reduction products formed.

In view of the shortcomings of so many well-known oxidizing and bleaching agents in producing the results desired herein, it is especially surprising that hydrogen peroxide has been found to be such an excellent color stabilizer.

We have found that aqueous hydrogen peroxide, when used in proper amounts, preferably from 2.0 percent to 8.0 percent on weight of copolymer, and preferably in solutions of acid pH, most preferably pH 2 to 6, keeps clear, colorless vinylidene cyanide interpolymer spinning solutions stabilized against the development of undesirable color for a period of days at room temperature.

The polymer, preferably in finely divided form, may be soaked in the aqueous hydrogen peroxide before being added to the polymer solvent, or the peroxide may be added to the polymeric solvent either before or after the polymer has been dissolved. In the former case, the need is to thoroughly "wet" the polymer particles and this may be facilitated by first wetting the polymer with alcohol to form a paste which will be more readily "wetted" than the raw hydrophobic polymer. In the second case where the polymer is already in solution, or about to go into solution, the need is to get thorough and intimate mixing of polymer molecule and peroxide. Good agitation of the mixture is essential to obtain best results. Once a given amount of polymer has been treated with the hydrogen peroxide oxidizing agent by either technique, it can be precipitated from the solvent, and later redissolved without further treatment, and it will still yield colorless polymer spinning solution.

The following examples serve to illustrate the practice of this invention.

*Example 1*

A supply of powdered vinylidene cyanide:vinyl acetate copolymer was prepared according to the teachings of U.S. Patent No. 2,615,866. Two grams of copolymer were wetted with ethanol and soaked in 10 grams of 10% aqueous hydrogen peroxide for fourteen days. The polymer was then collected on a filter, washed with distilled water and dried. The treated polymer was next dissolved in 10 grams of isovalerolactone. When this solution was placed beside a solution of two grams of untreated copolymer in isovalerolactone, the two solutions at first looked alike, pale amber in color. After one hour, however, the solution of treated resin was colorless while the untreated solution was still amber.

*Example 2*

Thirty-four grams of vinylidene cyanide:vinyl acetate copolymer were dissolved in 250 grams of distilled gamma-butyrolactone. 17 grams of 30% aqueous hydrogen peroxide were added and the solution, which was originally deep amber in color slowly lightened while standing at room temperature. After seven days the solution was colorless and clear. When extruded through a spinneret, the solution produced clear, colorless fibers of good strength. Another portion of clear gamma-butyrolacetone solution was vigorously agitated in a blender while methanol was slowly added. The alcohol addition caused the precipitation of a white solid which was dried and ground to powder form. An infrared spectrum of the powder was identical to that of untreated copolymer, indicating that no chemical change had occurred. Intrinsic viscosities of the treated and untreated gamma-butyrolactone solutions were also virtually identical, again indicating no degradation of copolymer by the hydrogen peroxide treatment.

The remainder of the treated copolymer powder was finally redissolved in gamma-butyrolactone and a colorless solution, with no trace of the usual amber color of vinylidene cyanide:vinyl acetate in gamma-butyrolactone, being produced.

*Example 3*

Sixteen grams of vinylidene cyanide:vinyl acetate copolymer were added to a cooled solvent consisting of 80 grams of nitromethane, 40 grams of acetone and 6.5 grams of 30% aqueous hydrogen peroxide and the mixture was placed on a rolling mill where an amber solution formed in ninety minutes. After standing 17 days at room temperature, the solution showed no apparent color, the amber color having disappeared.

*Example 4*

Twenty grams of vinylidene cyanide:vinyl acetate copolymer were dissolved in 80 grams of dimethylformamide and the colorless solution was divided into six equal parts. The pH of five of these portions was adjusted from about 11 down to 2, 4, 6, 8 and 10 respectively with nitric acid. To each portion with adjusted pH was added 0.2 gram of hydrogen peroxide as a 35 percent aqueous solution. The sixth portion was run as a control with no peroxide added. After the solutions were aged one hour at 65° C. the following observations were made:

| pH | Color of Solution |
| --- | --- |
| 2 | practically white. |
| 4 | very pale yellow. |
| 6 | very light yellow. |
| 8 | light yellow. |
| 10 | yellow. |
| 11 (no peroxide) | dark red. |

The hydrogen peroxide clearly has stabilized the dimethylformamide solution of the copolymer against the formation of the characteristic reddish color with best results being shown under acid pH conditions.

*Example 5*

Again twenty grams of vinylidene cyanide:vinyl acetate copolymer were dissolved in 80 grams of dimethylformamide. The colorless solution was divided into nine equal parts. Using nitric acid three parts were adjusted to pH 6, three parts to pH 7 and three parts to pH 8. Varying concentrations of hydrogen peroxide as a 35 percent aqueous solution were added to each series; the solutions were aged one hour at 65° C., and the following observations were made:

| pH | Percent $H_2O_2$ (based on copolymer weight) | Color of Solution |
| --- | --- | --- |
| 8 | 2.0 | dark yellow. |
| 8 | 4.0 | light yellow. |
| 8 | 8.0 | Do. |
| 7 | 2.0 | light red. |
| 7 | 4.0 | light yellow. |
| 7 | 8.0 | Do. |
| 6 | 2.0 | dark yellow. |
| 6 | 4.0 | light yellow. |
| 6 | 8.0 | Do. |

These data indicate that for the dimethylformamide solutions of the vinylidene cyanide:vinyl acetate copolymer a minimum amount of hydrogen peroxide is needed to effect good color stabilization when the solution is aged, but that increasing the hydrogen peroxide concentration above a certain level has no further beneficial effect.

*Example 6*

When vinylidene cyanide:vinyl chloride, vinylidene cyanide:styrene, vinylidene cyanide:ethyl acrylate and vinylidene cyanide:acrylonitrile copolymers prepared in accordance with the teachings of U.S. Patents 2,615,869, 2,615,868, 2,615,880, and 2,628,954 are dissolved in dimethylformamide, the solution pH adjusted to the acid range of 2 to 6 and 3 percent hydrogen peroxide is added, the copolymer solutions remain clear and colorless for periods of one week and longer when stored at room temperature.

Various modifications of our invention will be apparent to those skilled in the art. The invention is intended to be limited only by the scope and spirit of the appended claims.

We claim:

1. A stable, colorless spinning dope solution of a vinylidene cyanide interpolymer with at least one other olefinic monomer copolymerizable therewith in a solvent therefor, said vinylidene cyanide interpolymer having been treated after its formation and separation from the polymerization medium in the form of solid interpolymer particles with from 3 percent to 8 percent of its weight of aqueous hydrogen peroxide.

2. The solution of claim 1 further characterized in that it possesses a pH in the range of 2 to 6.

3. The solution of claim 1 further characterized in that the vinylidene cyanide interpolymer is a 1 to 1 molar copolymer of vinylidene cyanide and vinyl acetate and the solvent is selected from the class consisting of dimethylformamide, acetonitrile, nitromethane, isovalerolactone, and gamma-butyrolactone.

4. The solution of claim 1 further characterized in that the vinylidene cyanide interpolymer is a 1 to 1 molar copolymer of vinylidene cyanide and vinyl chloride and the solvent is selected from the class consisting of dimethylformamide, acetonitrile, nitromethane, isovalerolactone, and gamma-butyrolactone.

5. The solution of claim 1 further characterized in that the vinylidene cyanide interpolymer is a 1 to 1 molar copolymer of vinylidene cyanide and styrene and the solvent is selected from the class consisting of dimethylformamide, acetonitrile, nitromethane, isovalerolactone, and gamma-butyrolactone.

6. The solution of claim 1 further characterized in that the vinylidene cyanide interpolymer is a 1 to 1 molar copolymer of vinylidene cyanide and ethyl acrylate and the solvent is selected from the class consisting of dimethylformamide, acetonitrile, nitromethane, isovalerolactone, and gamma-butyrolactone.

7. The solution of claim 1 further characterized in that the vinylidene cyanide interpolymer is a 1 to 1 molar copolymer of vinylidene cyanide and acrylonitrile and the solvent is selected from the class consisting of dimethylformamide, acetonitrile, nitromethane, isovalerolactone, and gamma-butyrolactone.

8. A stable, colorless spinning dope solution of a vinylidene cyanide interpolymer with at least one other olefinic monomer copolymerizable therewith in a solvent therefor, said vinylidene cyanide interpolymer having been formed after its formation and separation from the polymerization medium in the form of solid interpolymer particles into a paste with alcohol and then treated with from 3 percent to 8 percent of its weight of aqueous hydrogen peroxide.

9. The method of preparing a stable, colorless spinning dope solution of a vinylidene cyanide interpolymer with at least one other olefinic monomer copolymerizable therewith which comprises treating said interpolymer with 3 to 8 percent of its weight of aqueous hydrogen peroxide and dissolving said interpolymer in a solvent therefor.

10. The method of claim 9 further characterized in that the solvent possesses a pH in the range of 2 to 6.

11. The method of claim 9 further characterized in that the solvent is dimethylformamide.

12. The method of claim 9 further characterized in that the vinylidene cyanide interpolymer is a 1 to 1 molar copolymer of vinylidene cyanide and vinyl acetate.

References Cited in the file of this patent

UNITED STATES PATENTS

| | | |
|---|---|---|
| 2,432,448 | Richards | Dec. 9, 1947 |
| 2,473,005 | Britton et al. | June 14, 1949 |
| 2,496,384 | De Nie | Feb. 7, 1950 |
| 2,628,954 | Gilbert | Feb. 17, 1953 |